United States Patent
Li

(10) Patent No.: US 7,366,427 B2
(45) Date of Patent: Apr. 29, 2008

(54) LINE DRIVER WITH VARIABLE BANDWIDTH CONTROL

(75) Inventor: Shenggao Li, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 673 days.

(21) Appl. No.: 10/874,767

(22) Filed: Jun. 22, 2004

(65) Prior Publication Data

US 2005/0281563 A1    Dec. 22, 2005

(51) Int. Cl.
*H04B 10/04* (2006.01)

(52) U.S. Cl. .................. 398/195; 330/103; 330/99

(58) Field of Classification Search ............... 398/195; 330/99–100, 103, 109, 293
See application file for complete search history.

(56) References Cited

U.S. PATENT DOCUMENTS

| | | | | |
|---|---|---|---|---|
| 3,925,774 A | * | 12/1975 | Amlung | 340/553 |
| 5,113,068 A | * | 5/1992 | Burke, Jr. | 250/214 B |
| 6,226,322 B1 | * | 5/2001 | Mukherjee | 375/229 |
| 6,720,826 B2 | * | 4/2004 | Yoon | 330/69 |

* cited by examiner

*Primary Examiner*—Leslie Pascal
(74) *Attorney, Agent, or Firm*—Kacvinsky LLC

(57) ABSTRACT

A method and apparatus to provide bandwidth control in a high speed line driver circuit is described.

20 Claims, 2 Drawing Sheets

LINE DRIVER WITH VARIABLE BANDWIDTH CONTROL

BACKGROUND

A high speed optical communication system may communicate information using optical signals at various transmission speeds, such as 2.5 Gigabits Per Second (Gbps), 10 Gbps, and so forth. These optical communication systems may use a transceiver circuit to transmit optical signals for propagation along a transmission path such as optical fiber. A light source or laser, included in the transceiver, generates light energy representative of received electrical information signals. A line driver may selectively supply laser-driving current to the light source responsive to a digital data signal employing a particular modulation technique. In high speed applications, however, it may be necessary to control the rise and fall time of the line driver output to reduce switching noise and maximize system performance. In addition, the overall bandwidth of the driver may become too small thereby resulting in cross jitter. Consequently, there may be a need for a line driver circuit with variable bandwidth control.

BRIEF DESCRIPTION OF THE DRAWINGS

The subject matter regarded as embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

The embodiments relate to negative feedback configuration of a line driver used in high speed optical communication systems. An example of a line driver may comprise a laser driver. More particularly, the embodiments relate to a tunable line driver to control the rise/fall time of the output to accommodate higher and lower bandwidth output signals. A distributed feedback circuit is utilized with a multi-stage amplifier. The feedback circuits each comprise a resistor array and a capacitor array. The resistor array may be used to increase bandwidth of the line driver, while the capacitor array may be used to decrease bandwidth of the line driver. By reducing the feedback resistance, the bandwidth of the driver will be increased. By increasing the feedback capacitance, the bandwidth of the driver will be reduced. Thus, by varying resistor values (or capacitors) the bandwidth changes, however this effect is limited if resistors (or capacitors) are used unilaterally.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Numerous specific details may be set forth herein to provide a thorough understanding of the embodiments. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiment. Although the embodiments described are associated with an optical communication system, the invention may be associated with any type of line driver.

Figure 1:
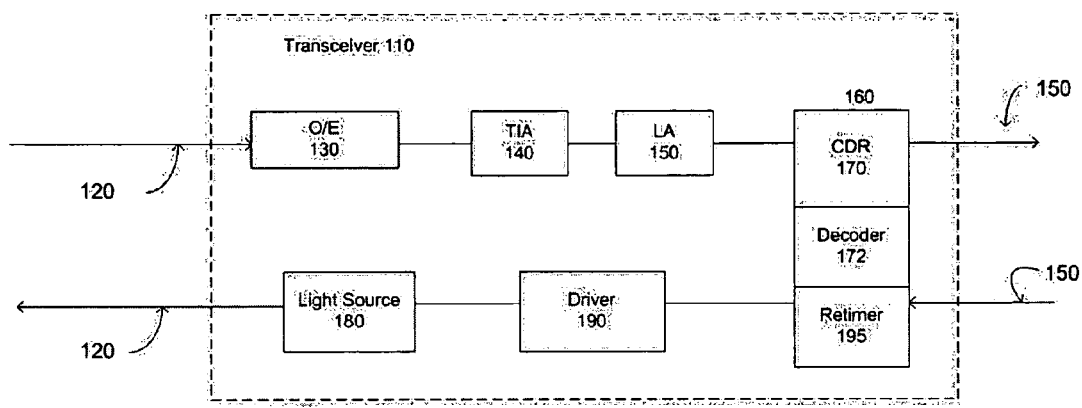
FIG. 1 illustrates a block diagram of a transceiver utilized in high speed optical communication systems in accordance with practicing one embodiment.

Referring now in detail to the drawings wherein like parts may be designated by like reference numerals throughout, there is illustrated in FIG. 1 a block diagram of a high speed optical transceiver 110 suitable for practicing one embodiment. A high speed optical communication system is configured with transceiver 110 at both ends of transmission medium 120 to accommodate bidirectional communication of information signals. The expression "information signals," as used herein, may refer to a signal which has been coded with information. These signals may be amplified during propagation by optical amplifiers disposed along the transmission medium 120. The power levels associated with these transmitted signals may vary significantly due to a number of effects including span and splice losses, as well as fiber nonlinearities.

In one embodiment, transceiver 110 may include an optical to electrical (O/E) converter module or photodetector 130, transimpedance amplifier (TIA) 140, limiting amplifier 150, CDR module 160 which includes a clock and data recovery circuit (CDR) 170 and decoder 172 for the receive side (encoder, not shown for the corresponding transmit side) and light source or laser 180, line driver 190 and re-timer circuit or encoder 195 for the transmit side. The receive side of transceiver 110 receives optical information signals propagating along transmission medium 120. The optical information signals are incident on O/E module 130, configured to detect an individual or range of wavelengths, where optical energy is converted to an electrical current proportional to the received optical signals. The received electrical current is converted into a voltage by TIA 140. LA 150 amplifies the received voltage from TIA 140 and supplies it to CDR 170.

The transmit side of transceiver 110 may include re-timer circuit 195 which receives information signals in electrical form and supplies these signals to line driver 190 which generates current variations proportional to the received information signals. Re-timer circuit ensures that the datastream is clocked before transmission by a high-quality (typically low jitter) clock signal. The re-timer circuit may be preceded by other processing logic to form the data stream. For example, the data stream may be processed by error correction logic prior to transmission by transceiver 110. Light source or semiconductor laser 180 generates optical signals proportional to the received current levels for transmission over optical fiber 120. Light source 180 may have an input impedance of 25 or 50. Likewise, the impedance of driver 190 should match the impedance of source 180 to avoid costly customized systems or component designs while providing operating efficiencies within transceiver 110.

The information signals may be transmitted by transceiver 10 at high data rates such as OC48 (2.5 Gbps) and OC192 (10 Gbps). The information signals may be modulated using various techniques such as non-return to zero (NRZ), where the signal does not return to a logic 0 before the next successive data bit. For example, the data signal remains at a logic high or 1 if two successive 1 bits are transmitted. This modulation format may have a higher effective speed as compared to return to zero (RZ) modulation since the RZ modulation scheme may need twice the number of pulses for the same NRZ data transmission.

A typical line driver 190 of transceiver 110 has a limited bandwidth which, at high speeds, may result in a band limited signal with inter-symbol interference and a closed eye pattern. An eye pattern is a representation of the output data stream and includes both amplitude and phase characteristics of the data. For example, a horizontal axis may represent the phase characteristics of the data, while the vertical axis may represent the amplitude characteristics of the data. An increase in inter-symbol interference may result in a closed eye pattern where the threshold power levels may compromise the detection of the data signals, i.e., distinguishing between 1's and 0's. At very high data rates, the rise and fall transition between the 1's and 0's may be too fast thereby creating switching noise. By reducing the bandwidth of driver 190, these transitions may slow down accordingly. If the bandwidth is too small, however, cross jitter may result and an increased bandwidth may be needed to open the eye pattern. Consequently, a variable bandwidth line driver may be desirable.

Figure 2:
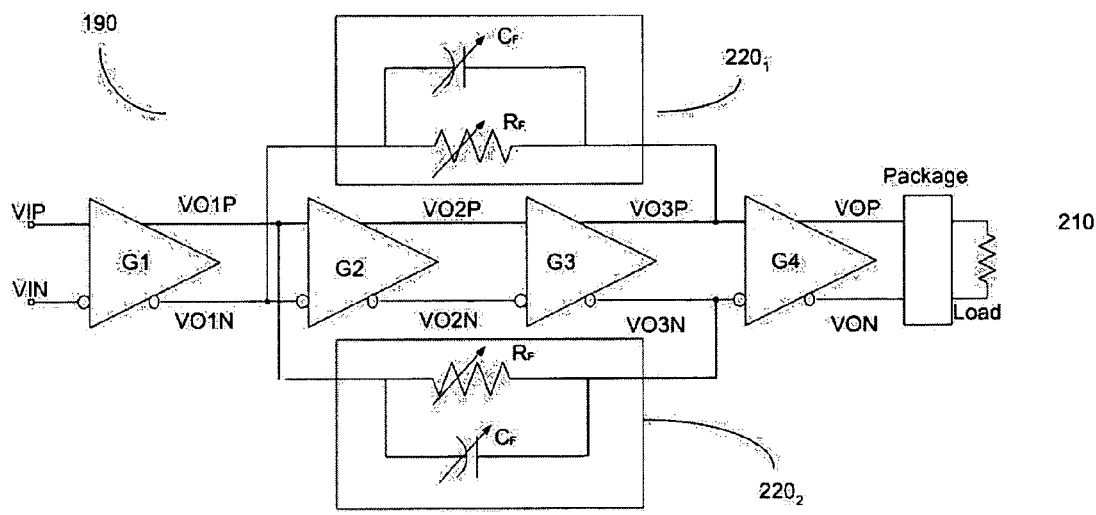
FIG. 2 illustrates a schematic diagram of a line driver in accordance with one embodiment.

FIG. 2 illustrates a line driver 190 in accordance with one embodiment. Line driver 190 may comprise a plurality of gain stages G1-G4 and controlled feedback RC circuits $220_1$ and $220_2$. Gain stages G1-G4 may be arranged in a multiple stage amplifier configuration, sometimes referred to as a "Cherry-Hooper" amplifier configuration. A Cherry-Hooper amplifier may produce a characteristic delay between receipt of the input voltage and transmission of the amplified output voltage signal.

In one embodiment, for example, gain stages G1-G4 may be implemented using current mode logic (CML) technology. The multiple gain stages may be arranged to provide sufficient signal strength to drive a typical load 210. An example of a typical load 210 may comprise a termination resistor of 100 Ω (differential). Gain stage G1 may receive voltage inputs VIP and VIN, and may convert the voltage signals to a current proportional to the input signal via output VO1P and inverted output VO1N. Gain stage G2 may amplify the outputs from stage G1, and may provide output VO2P and inverted output VO2N. Similarly, gain stage G3 may amplify the outputs from stage G2 and provide output VO3P and inverted output VO3N. Gain stages G2 and G3 may form a TIA that receives the current output from gain stage G1 and supplies the input signal to G4. Gain stage G4 may amplify the outputs from stage G3 and supply output VOP and inverted output VON to drive load 210. For example, load 210 may have a differential load impedance of 100 Ω driven by a fixed or variable current from driver 190.

In one embodiment, differential negative RC feedback circuits $220_1$ and $220_2$ may be disposed between the outputs of gain stage G3 and the inputs of gain stage G2. The feedback circuits $220_1$ and $220_2$ may be symmetrical to provide a differential circuit. Each circuit $220_1$ and $220_2$ may comprise a resistor array $R_{Fn}$ and a capacitor array $C_{Fn}$. The resistor arrays RF1 and RF2 and associated values, may be used to increase bandwidth of line driver 190. The capacitor arrays $C_{F1}$ and $C_{F2}$ and associated values may be used to decrease bandwidth of line driver 190. In particular, resistor RF1 of feedback circuit $220_1$ is connected between output VO3P of stage G3 and the input of stage G2 that receives output VO1N from gain stage G1. Resistor $R_{F2}$ of feedback circuit $220_2$ is connected between output VO3N of gain stage G3 and the input of stage G2 that receives output VO1P from gain stage G1. As noted above, if the bandwidth of driver 190 becomes too small resulting in large cross jitter, the resistors $R_{F1}$ and $R_{F2}$ provide an increase in bandwidth. Thus, if the feedback resistance is reduced, the bandwidth of the driver will be increased. If the feedback capacitance is increased, the bandwidth of the driver will be reduced.

In one embodiment, capacitor $CF_1$ of feedback circuit $220_1$ is connected in parallel with resistor $R_{F1}$ between output VO3P of stage G3 and the input of stage G2 that receives output VO1N from gain stage G1. Capacitor $C_{F2}$ of feedback circuit $220_2$ is connected in parallel with resistor $RF_2$ between output VO3N of gain stage G3 and the input of stage G2 that receives output VO1P from gain stage G1. As noted above, capacitors $C_{F1}$ and $C_{F2}$ are used to reduce the bandwidth of driver 190 such that the rise and fall transitions of the driver output are slowed thereby reducing switching noise. The effective capacitance of capacitors $C_{F1}$ and $C_{F2}$ is given by $G2*G3*C_F$ according to the Miller effect. The Miller effect states that the simultaneous switching of both terminals of a capacitor will modify the effective capacitance between the terminals. The Miller effect compensation technique may be used in op-amps to facilitate stability by using capacitance devices coupled in a feedback path between a feedback compensation node configured within the op-amp and an output of the op-amp. The size of the switching capacitance is reduced by a factor of the gain of stage G2 multiplied by the gain of stage G3(G2*G3). The transition of outputs for gain stage G3, and consequently the output voltage to gain stage G4 which drives load 210, is slowed. In this manner, the bandwidth of driver 190 is adjustable by controlling RC feedback circuits $220_1$ and $220_2$.

While certain features of the embodiments have been illustrated as described herein, many modifications, substitutions, changes and equivalents will now occur to those skilled in the art. It is, therefore, to be understood that the appended claims are intended to cover all such modifications and changes as fall within the true spirit of the embodiments.

The invention claimed is:

1. A line driver, comprising:
    a plurality of gain stages connected in series, with a first gain stage to generate a current signal output proportional to an input voltage signal;
    a first negative feedback circuit having a resistor and a capacitor connected in parallel, said feedback circuit connected between a first input of a second gain stage and a second output of a third gain stage; and
    a second negative feedback circuit having a resistor and a capacitor connected in parallel, said feedback circuit connected between a second input of said second gain stage and a first output of said third gain stage, said first and second feedback circuits arranged to control an output bandwidth spectrum for a fourth gain stage.

2. The line driver of claim 1, wherein said resistor of said first and second feedback circuits when reduced increase said output bandwidth.

3. The line driver of claim 2, wherein said capacitor of said first and second feedback circuits when increased decrease said output bandwidth.

4. The line driver of claim 1, wherein said second gain stage and said third gain stage form a transimpedance amplifier.

5. The line driver of claim 1, wherein said resistor of said first feedback circuit is connected between said first input of said second gain stage and said second output of said third gain stage.

6. The line driver of claim 1, wherein said capacitor of said first feedback circuit is connected between said first input of said second gain stage and said second output of said third gain stage.

7. The line driver of claim 1, wherein said resistor of said second feedback circuit is connected between said second input of said second gain stage and said first output of said third gain stage.

8. The line driver of claim 1, wherein said capacitor of said second feedback circuit is connected between said second input of said second gain stage and said first output of said third gain stage.

9. The line driver of claim 1, wherein said second input of said second gain stage is an inverted input.

10. The line driver of claim 1, wherein the second output of said third gain stage is an inverted output.

11. A method, comprising:
supplying input signals to a first stage of a multi-stage amplifier;
amplifying said input signals with a transimpedance amplifier comprised of at least a second and a third stage of said multi-stage amplifier; and
controlling the bandwidth of a driver using a first negative feedback circuit and second negative feedback circuit operatively coupled between an input of said second gain stage and an output of said third gain stage of said multi-stage amplifier, wherein each negative feedback circuit includes a resistor and a capacitor connected in parallel.

12. The method of claim 11 wherein each of said resistors have an associated resistance values, said method further comprising increasing the bandwidth of said driver by decreasing the resistance value of said first and second negative feedback circuits.

13. The method of claim 11 wherein each of said capacitors have an associated capacitance value, said method further comprising decreasing the bandwidth of said driver by increasing the capacitance value of said first and second negative feedback circuits.

14. An optical communication system comprising:
a transmission medium to propagate optical information signals;
a laser light source connected to said transmission medium; and
a line driver to supply a drive current to said light source responsive to a digital data signal, said line driver including a plurality of gain stages and a first and second negative feedback circuits, each of said feedback circuits including a resistive value and a capacitive value, said feedback circuits controlling a bandwidth for said line driver, wherein said resistive value is utilized to increase the bandwidth of said line driver and said capacitive value is utilized to decrease the bandwidth of said line driver.

15. The optical communication system of claim 14, wherein said first feedback circuit has an input and an output, and said output of said first feedback circuit is connected at an input of a second gain stage and said input of said first feedback circuit is connected to an output of a third gain stage.

16. The optical communication system of claim 14, wherein said second feedback circuit has an input and an output, and said output of said second feedback circuit is connected at an input of a second gain stage and said input of said second feedback circuit is connected to an output of a third gain stage.

17. The optical communication system of claim 14, wherein a second gain stage and a third gain stage forms a transimpedance amplifier circuit.

18. The optical communication system of claim 14, wherein a first gain stage is arranged to generate a current signal output proportional to an input voltage signal.

19. The optical communication system of claim 14, wherein a fourth gain stage outputs a drive signal to said light source.

20. The optical communication system of claim 14, wherein said capacitive value in said first feedback circuit is in parallel with said resistive value of said first feedback circuit, and said capacitive value in said second feedback circuit is in parallel with said resistive value of said second feedback circuit.

* * * * *